June 25, 1929. E. T. HARNEY Re. 17,333

VARIABLE LINE SPACER

Original Filed Jan. 20, 1927

INVENTOR
Emmet T. Harney
BY C. F. Grepel
his ATTORNEY

Reissued June 25, 1929.

Re. 17,333

UNITED STATES PATENT OFFICE.

EMMET T. HARNEY, OF GARWOOD, NEW JERSEY.

VARIABLE LINE SPACER.

Original No. 1,657,392, dated January 24, 1928, Serial No. 162,350, filed January 20, 1927. Application for reissue filed June 20, 1928. Serial No. 287,021.

This invention relates to variable spacers and more particularly to a line spacer adapted for typewriters.

The object of the invention is to provide a simple form of attachment which requires the use of but one hand to be operated; and which, when given a small movement will release the clutch between the ratchet wheel of the typewriter and cylinder or platen which the ratchet wheel turns.

I am of course aware that there is a well-known device of this character in which longitudinal movement causes release of the ratchet wheel from the platen or cylinder to permit of variable line spacing, but such device requires the use of both hands; one to prevent displacing the cylinder longitudinally as the clutch mechanism is released with the other; while my invention is an improvement which enables the operator to release the clutch with one hand only, and there is no force on the cylinder tending to shift the later in the direction of its longitudinal axis.

With these and other objects in view, the invention consists in certain novel features of construction and combinations and arrangements of parts, which will be more fully hereinafter described and pointed out in the claims.

In the accompanying drawings—

Figure 5:
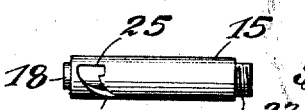
Figure 5 is an elevation of my improved cam sleeve.
Figure 6:
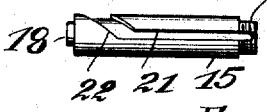

Figure 6 is another elevation thereof seen from the bottom of Figure 5. Numeral 1 represents the cylinder or platen of a typewriter having a disk 2 fixed to the end of the cylinder, and a ratchet wheel 3 located against the disk 2 and arranged to be operatively connected to said disk by means of a standard type of clutch, not shown, associated with arms 4—4 extending into the cylindrical bore 5 on the inside of the platen or cylinder.

I have not attempted to illustrate in detail the clutch as this is standard equipment, but I merely illustrate the arms 4 which control the clutch and constitute a part thereof, so that in reality the arms 4 may be construed as clutch actuating members.

Figure 3:
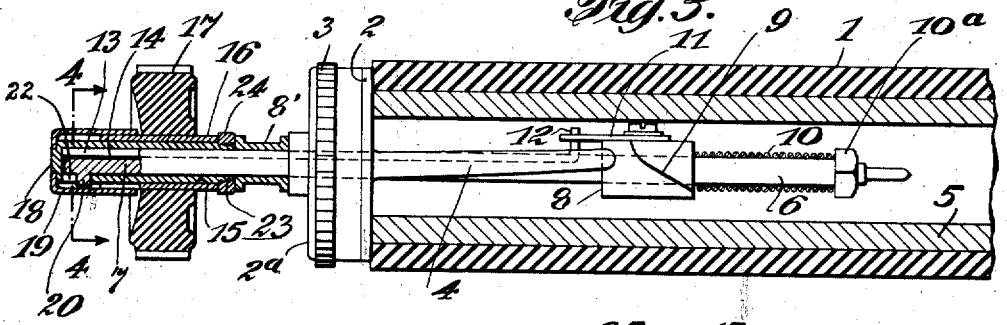
Figure 3 is a view similar to Figure 2, showing the position of parts when the clutch and the ratchet are released.
Figure 4:
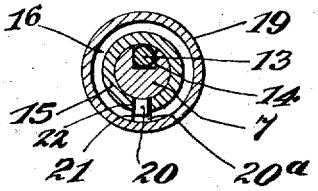
Figure 4 is an enlarged view in section on the line 4—4 of Figure 3.

The disk 2 has a boss or hub not shown, projecting to the left, with reference to the drawings, and the ratchet wheel 3, which is in the form of a ring or band, fits over this hub and can revolve thereon when the clutch above-mentioned is disengaged. A disk $2^a$, of greater diameter than the hub of the disk 2, fits against this hub and is secured to it to keep the wheel 3 from coming off. The clutch is inside the disk 2 and the arms 4 have their adjacent ends attached to the clutch; and movement of the arms 4 downward with reference to Figures 3 and 4 causes the clutch to connect the disk 2 and wheel 3, so that they must rotate together. When the outer ends of the arms 4 are freed, the ratchet wheel is released. This type of clutch actuated by the arms 4 is well known, and is not a part of my invention.

At 6 is a shaft which extends longitudinally into the bore 5 and through the disks 2 and $2^a$ and ratchet wheel 3, and projects beyond the end of the cylinder, forming a supporting trunnion 7 mounted in a bearing 8′, this bearing adapted to be secured to a fixed part of the machine, as is well understood in the art. There will of course be a second bearing 8′ at the opposite end, not shown, of the platen 1, and a second trunnion attached to the platen to support the opposite end.

A block 8 or element is mounted to slide on the shaft 6 within the cylinder 1, and has cam faces 9 thereon engaging the outer ends of the arms 4. A coiled spring 10 located back of the block 8 on the shaft 6 exerts pressure on this block to normally hold the cam faces 9 in engagement with the arms 4 to press the arms down and hold the clutch in its engaged position; locking the ratchet wheel 3 to the disk 2. This position of the parts is clearly indicated in Figures 1 and 2 of the drawings. The spring 10 is held on the shaft by a nut 10[a].

On the block 8 a plate 11 is secured and is operatively engaged by a finger 12 on the end of a rod 13. This rod 13 lies within a longitudinal groove 14 extending to the outer end of the shaft 6, and the part 13 normally extends beyond the end of the shaft, as indicated in dotted lines in Figures 1 and 2.

On the outer end or trunnion portion 7 of the shaft 6 I locate a cam sleeve 15, which fits the shaft but is adapted to slide and turn thereon. 16 represents a tube located around the cam sleeve 15, and to which a knob or button 17 is secured to act through the shaft 6 to rotate the cylinder 1, as is customary. The shaft 6 is fast to the disks 2 and 2[a]; and the member 15 can turn in the tube 16.

The outer end of my improved cam sleeve 15 is closed and formed with a projection 18 on its closed end. 19 represents a cap which fits over the tube 16 and has an opening receiving the enlargement 18. This enlargement 18 and the opening in the cap may be angular so as to compel these two parts to turn together, or the sleeve and the cap may may be secured together in any other manner so that when the cap is turned the sleeve will turn with it. The cap is preferably fastened to the tubular member 15.

The trunnion 7 of the shaft 6 adjacent its outer extremity is provided with a lug 20 which is movable through a longitudinal slot 21 in the cam sleeve 15, and is normally positioned in a diagonal cam slot 22 which communicates with the slot 21. In other words, this portion of the slot given the reference numeral 22 has its edges disposed at an angle to the longitudinal axis of the sleeve so that, when the sleeve is turned, the cam slot 22 will cause the sleeve to move longitudinally on the trunnion 6 by reason of the engagement of the lug 20 with the sides thereof and as the sleeve moves in one direction it forces the rod 13 inward longitudinally, for the outer extremity of this rod 13 bears against the closed end of the sleeve, as clearly indicated in Figures 2 and 3 of the drawings.

The inner extremity of the sleeve 15 is reduced in diameter and screw-threaded, as indicated at 23, to receive a nut 24 bearing against the end of the tube 16 to hold the parts in proper assemblage.

The end of the cam slot 22 of sleeve 15 is made with a notch 25 therein to accommodate the projecting part or lug 20 affixed to the shaft when the parts are in a predetermined position. The tube 16 has a straight slot 20[a], into which the lug 20 projects after passing transversely through the slot in the sleeve 15. Hence the tube 16 and knob 17 can slide back and forth with the sleeve 15 on the trunnion 7; but when the knob is turned, the trunnion 7 and platen 1 must rotate also. The slot 21 plays no part in the operation of the device, but allows the sleeve to be slipped upon the shaft 6.

The operation is as follows:—

Figure 1:
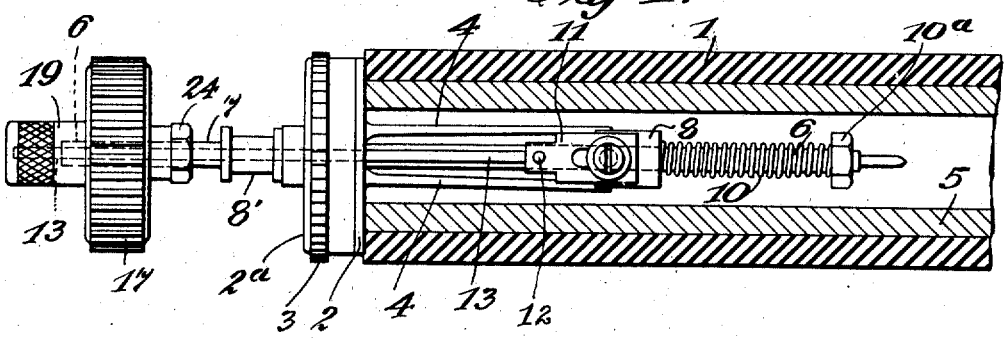
Figure 1 is a view, partly in elevation and partly in longitudinal section, illustrating my improved attachment in connection with a well known make of typewriter in general use.
Figure 2:
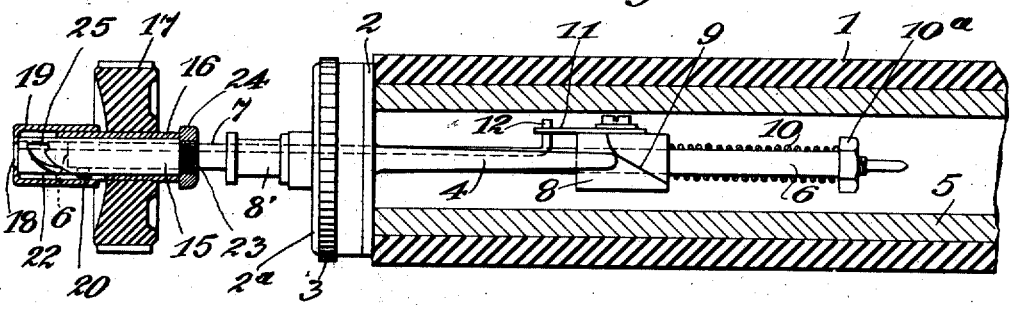
Figure 2 is a view, partly in elevation but mainly in longitudinal section, at right angles to the plane of section in Figure 1, showing the parts in position to cause the usual clutch to hold the platen or cylinder and the ratchet wheel in connection, so that the latter can rotate the former.

Figures 1 and 2 show the parts in normal position. The lug 20 then lies about where the diagonal slot 22 unites with the longitudinal slot 21. When it is desired to vary the line space, the operator grasps the cap 19 between the thumb and finger and imparts a turning or partial rotary motion thereto. This motion will be clockwise, when the cap 15 is observed from the left of these figures, that is, downward in Figure 2 on the side presented to the observer. The shaft 6 is fast relative to the disk 2 and neither slides nor turns therein, hence the shaft 6 now remains stationary. As the cap 19 and the cam sleeve 15 are fixed to move together, the turning movement of the sleeve by reason of the lug 20 and the cam slot 22, will impart longitudinal movement to this sleeve to the right and exert a push on the end of rod 13 to force the block 8 to the right of Figure 2 against the presure of spring 10, so that the cams 9 are moved away from the ends of the clutch arms 4 and the latter are freed and the clutch between the disk 2 and ratchet wheel 3 is released. As this clutch locks the ratchet wheel 3 to the disk 2 it will be readily understood that when the clutch is released the cylinder 1 can be turned in either direction by grasping and rotating the knob 17; which acts through the tube 16, slot 20[a], lug 20, trunnion 7, shaft 6, and disk 2.

When the cap 19 is turned to cause the release of the clutch, the lug 20 moves away from the longitudinal slot 21 and along the diagonal slot 22 into the notch 25, which holds the sleeve 15 against turning and slipping back. Hence the block 8 stays in the position of Figure 3, and the ratchet 3 remains disengaged till the cap 19 is grasped and rotated backward. This movement causes the lug to be freed from the notch 25, and then the spring 10 presses block 8 back to make the cams 9 reengage with the arms 4, and the rod 13 pushes back the cap 19, returning the sleeve 15, to original position. This sleeve 15, through nut 24, pulls back the knob 17 and tube 16 with it.

Thus only one hand is needed, for all that is required to disconnect the ratchet wheel is seize the cap 19 and turn it slightly. The platen 1 is not shifted or rotated when the cap 19 is turned, and therefore one does not need to hold the platen at this time. After the ratchet is released, it stays released, and the same hand can be used to grasp the knob 17 to turn the cylinder 1. Turning back the cap 19 again connects the cylinder 1 and ratchet 3.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. The combination with a clutch controlling rod and shaft having a groove therein in which said rod is mounted, of a sleeve mounted to slide on the shaft and having a cam slot therein, a lug on the shaft engaging in the cam slot, said sleeve adapted when moved longitudinally to move the rod longitudinally, and a cap connected to the sleeve and adapted when turned to impart rotary motion to the sleeve and longitudinal movement to the rod.

2. The combination with a clutch controlling rod and shaft having a groove therein in which said rod is mounted, of a sleeve mounted to slide on the shaft and having therein a curved cam slot with a dwell portion, a lug on the shaft engaging in the slot, said sleeve adapted to turn on the shaft, to be advanced longitudinally thereof by the engagement of said lug with the slot therein and serving as means whereby to move the rod longitudinally, said lug adapted on movement of the sleeve longitudinally to enter said dwell portion and therein to maintain said sleeve and rod against reverse movement, and means for turning the sleeve on the shaft into and out of a position in which said dwell portion will receive said lug.

3. The combination with a clutch controlling rod and shaft having a groove therein in which said rod is mounted to have longitudinal movement, of a sleeve mounted to move freely on the shaft and having a diagonal cam slot therein, a lug on the shaft engaging within the cam slot of the sleeve, means for turning the sleeve, said lug and diagonal cam slot cooperating to cause the sleeve during its turning movement to advance longitudinally of said shaft, and a part movable with the sleeve and cooperating with said rod to cause the latter to move longitudinally of the shaft in proportion to the longitudinal advancement of the sleeve thereon.

4. The combination with a clutch controlling rod and shaft having a groove therein in which said rod is mounted to have longitudinal movement, of a sleeve mounted to move freely on the shaft and having a diagonal cam slot therein, a lug on the shaft engaging within the cam slot of the sleeve, means for turning the sleeve, said lug and diagonal cam slot cooperating to cause the sleeve during its turning movement to advance longitudinally of said shaft, a part movable with the sleeve and cooperating with said rod to cause the latter to move longitudinally of the shaft in proportion to the longitudinal advancement of the sleeve thereon, said slot including a dwell portion at the end thereof to receive said lug in order to maintain the sleeve and rod in advanced positions, and means associated with the sleeve and engaged by said lug whereby to turn the sleeve and shaft together in either direction while said lug is received in said dwell portion.

5. The combination with a clutch controlling rod and shaft having a groove therein in which said rod is mounted to have longitudinal movement, of a sleeve mounted to move freely on the shaft and having therein a diagonal cam slot with a dwell portion, a lug on the shaft engaging within the cam slot of the sleeve, means for turning the sleeve, said lug and diagonal cam slot cooperating to cause the sleeve, when turned, to advance longitudinally of the shaft to bring said dwell portion about said lug, a part movable with the sleeve and cooperating with said rod to cause the latter to move longitudinally of the shaft in proportion to the longitudinal advancement of the sleeve thereon, said lug and dwell portion being adapted to cooperate together to prevent reverse movement of the sleeve and said rod longitudinally of the shaft until the sleeve is turned reversely by the sleeve turning means.

6. In a typewriting machine, consisting of a platen; a shaft; a ratchet and releasable clutch mechanism controlling the connection of the ratchet with the platen including a spring to call the parts into clutching action; a rod movable longitudinally of the shaft adapted to compress said spring for the release of said clutch mechanism; a sleeve controlling the rod freely movable on the shaft and having therein a diagonal slot with a dwell portion, a lug on the shaft engaging within the slot of the sleeve, means for turning the sleeve, said lug and slot cooperating to cause the sleeve, when turned, to advance along the shaft and move said rod to compress the spring, said lug and dwell portion being adapted to cooperate together to prevent reverse movement of the sleeve and rod until the sleeve is turned reversely by the sleeve turning means.

7. In a typewriting machine, consisting of a platen; a shaft; a ratchet and releasable clutch mechanism controlling the connection of the ratchet with the platen including a spring to call the parts into clutching action; a rod movable longitudinally of the shaft adapted to compress said spring for releasing the clutch mechanism; a sleeve controlling the rod freely movable on the shaft and having therein a diagonal slot with a dwell portion, a lug on the shaft engaging within the slot of the sleeve, means for turning the sleeve, said lug and slot cooperating to cause the sleeve, when turned, to advance along the shaft and move said rod to compress the spring, said lug and dwell portion being adapted to cooperate together to prevent reverse movement of the sleeve and rod until the sleeve is turned reversely by the sleeve turning means, and a knob for turning the sleeve and shaft together while the spring is held compressed during the cooperation of said lug and dwell portion.

In testimony that I claim the foregoing as my invention, I have signed my name hereto.

EMMET T. HARNEY.